United States Patent
Mori

(10) Patent No.: US 6,267,944 B1
(45) Date of Patent: Jul. 31, 2001

(54) METHOD OF PREPARING A SOLUTION FOR TITANIA FILM

(75) Inventor: Yoshihar Mori, Tokyo (JP)

(73) Assignee: Morioki Sangyo Company Limited, Tokyo (JP)

( * ) Notice: Subject to any disclaimer, the term of this patent is extended or adjusted under 35 U.S.C. 154(b) by 0 days.

(21) Appl. No.: 09/386,846

(22) Filed: Aug. 31, 1999

(30) Foreign Application Priority Data

Jul. 5, 1999 (JP) .................................................. 11-189824

(51) Int. Cl.$^7$ .......................... C01B 15/00; C01G 23/047
(52) U.S. Cl. ............................................. 423/610; 423/582
(58) Field of Search ..................................... 423/582, 610

(56) References Cited

U.S. PATENT DOCUMENTS

| | | | |
|---|---|---|---|
| 3,139,325 | * 6/1964 | Takada | 423/582 |
| 5,593,737 | 1/1997 | Meinzer et al. | |
| 5,689,798 | 11/1997 | Oeste . | |
| 5,874,701 | 2/1999 | Watanabe et al. | |
| 6,066,359 | * 5/2000 | Yao et al. | 423/610 |
| 6,107,241 | * 8/2000 | Ogata et al. | 423/610 |

FOREIGN PATENT DOCUMENTS

| | | | |
|---|---|---|---|
| 252301 | * 11/1987 | (JP) | 423/582 |
| 6-190023 | 7/1994 | (JP) . | |
| 7-809 | 1/1995 | (JP) . | |
| 7-96173 | 4/1995 | (JP) . | |
| 7-106352 | 11/1995 | (JP) . | |
| 9-262481 | 10/1996 | (JP) . | |
| 9-71418 | 3/1997 | (JP) . | |
| 10-53437 | 2/1998 | (JP) . | |

* cited by examiner

Primary Examiner—Wayne Langel
(74) Attorney, Agent, or Firm—Staas & Halsey LLP

(57) ABSTRACT

A method of preparing a solution for titanium oxide film is provided such that said solution has the effect of a photocatalyst, by coating, or impregnating therewith a variety of substrates being positioned in a place where no ultraviolet light is emitted.

Utilizing a solution for titania film provided by a mixture of a titanium peroxide solution made from a compound of a titanium hydrate gel and a peroxide solution, and a solution forming titanium peroxide particles by calcining said titanium peroxide solution at a temperature over 80° C., particles of capsicin, magnetite and tourmaline, as well as a silica solution are each compounded to said solution for titania film, such that an improved solution for titania film can be obtained having the photocatalysic effect without any exterior light source.

7 Claims, No Drawings

METHOD OF PREPARING A SOLUTION FOR TITANIA FILM

BACKGROUND OF THE INVENTION

1. Field of the Invention

The invention relates to a method of prepaing a solution for a titania film by improving the components thereof 2. Prior Art Heretofore, the prior art has disclosed a meihod in which a solution for titania film is prepared by mixing a compound of a titanium hydrate gel and a peroxide solution, with a solution forming titanium peroxide particles by calcify said compound over 80° C. Same solution for titania film thus calcined and dried has the excellent effect of adhering to a substrate when coated thereon.

When exposed to weak ultraviolet rays emitting from sunlight, a fluorescent lamp and a mercury lamp, said solution coated on a substrate reacts such that noxious substances composed of organic compounds are oxidized and dissolved. Thus, said solution has rapidly gained a reputation on the market as a photoctalyst having, by coating or impregnating therewith, an oxidization reaction excited by ultraviolet rays through a titania film medium.

As described above, by absorbing photo-energy generating from weak ultra-violet rays, a titania film activates on the swfce of a substrate that is coated or impregnated therewith such that pollutants including NOx and CO2 can be abated. In this manner, said solution contributes to improving the effect of purifying air and water, as well as that of antibacterial and disinfecting reactions.

As set forth earlier, a photocatalyst utilizmg a titW a film medium as disclosed by the pnor art requires ultaviolet rays emitted from sunlight, a fluorescent lamp or a mercury lamp. Hence, odization by said photocatalyst fails to sufficiently react where no light source is available. Said photocatalyst has, therefore, a disadvantage that it could not sufficiently disinfect the interior wall of a large structure such as a tunnel, a ballast tank and a dark room, as well as the inside of a night bus body, a chest of drawers or a shoe cabinet.

Under the circumstances, it has been considered vitally important to invent a method of providing a titania film without requiring any light source as referred to above, or such of applying the film with an antibacterial metal medium.

SUMMARY OF THE INVENTION

The invention provides a method of preparing an improved solution for forming a titania film in such that particles of capsicin, magnetite and tourmaline, as wel as a silica solution, each diluted in distilled water, are compounded with a base comprising a compound of a titanium hydrate gel and a peroxide solution, and a solution fobrming titanium peroxide particles by calcining said compound at a temperature higher than 80° C.

In case a protective film is formed on the surface of a substrate coated or impregnated with a solution of the invention, said film serves as a photocatalyst reacting without any extenor light source. It is, therefore, an object of the invention to provide a metod of preparing an improved solution for titania film having, like a photocatalyst, the effect of exciting anti-bacterial, or mold-proof reactions, as well as abatement and purification of air pollution even when applied where no ultraviolet light is emitted. Hence, it can be applied to the interior suffice of a large strucure being exposed to no light, such as a tunnel, a ballast tank etc.

Another object of the invention is to prepare an improved solution for titania film having the effect of exciting antibacterial, or mold-proof reactions, as well as abatement and purification of air pollution, even when applied to the interior suces of a variety of such articles as normally positioned where no light source is available, such as a wardrobe in home, a locker in school, as well as shoes etc.

Further, another object of the invention is to prepare an improved solaion for titania film having the excellent insect-cidal effect by making use of capsicin; hence rats and ants are prevented from damaging electric wire circuits resulting in a computer trouble.

And, a firthr another object of the invention is to prepare an improved solution for titania film preventing barnacles and oysters from adhering to culture nets or fixed shore nets being deposited deep in the sea where no ultraviolet light reaches, so contributing to encouraging the fishery industry.

DETAILED DESCRIPTION

According to the invention, a solution for forming a titania film is prepared in such a method that particles of capsicin, magnetite and tourmaline, as well as a silica solution, each diluted in distilled water, are compounded with a base comprising a compound of a titanium hydrate gel and a peroxide solution, and a solution forming titanium peroxide particles by calcining said compound at a temperature higher than 80° C.

Said base being neutral or around pH 7 is suble for applying to a nonacid resisting substrate. Further, same base can be produced cheaply, yet excels in adhering to a substrate. It is offered to market under the brand names of "Peroxo-titanium (PTA solution)", "Peroxo-anatase sol (PS sol)" and "TPX sol", respectively.

The invention utilizes as a base the liquid for formng titania film being publicly offered under the brand name of "TPX sol". Into said liquid formng titania film, particles of capsicin, magnetite and tourmaline, as well as a silica solution all diluted in distilled water are compounded, respectively. Said TPX sol is offered as a solution containing 0.85 wt. % titanium peroxide, diluted by 91.5 wt. % of distilled water.

In this case, said capsicin solution being mixed with other components is preferably prepared within the range from 0.01 to 15 wt. % by application of the solution of the invention. The amount of capsicin in its raw material varies by natural conditions such as its country of origin and kind. Hence, the density of capsicin solution is not necessary confined in its application to above-mentioned range.

Likewise, said solution of magnetite particles being mixed with other components is preferably prepared witn the range from 10 to 40 wt. % by application of the solution of the invention. However, the density of the solution of magnetite particles is not confined in its application to above-mentioned range.

And likewise, said solution of tourmalie particles being mixed with other components is preferably prepared within the range from 0.5 to 15 wt. % by application of the solution of the invention. However, the density of the solution of totalix particles is not confined in its application to above-mentioned range.

Further, said silica solution being mixed with other components is preferably prepared within the range from 1 to 5 wt. % by application of the solution of the invention. However, the density of the silica solution is not confined in its application to above-mentioned range.

Magnetite particles comprised in the solution of the invention generate electromagnetic waves of different wavelength (a light source), when some energy is added to, or taken from electrons of said magnetite departing from the natural orbit thereof. Accordingly, a very small amount of ultraviolet light emitted from said electromagnetic wave affects titanium oxide such that its oxidization is excited.

In the meanwhile, the particles of tourmaline consisting of the solution of the invention have at its lattices some magnetic polarity that is charged with electricity when pressure is added thereto, thus irradiating light. With light thus irradiated, said tourmalne particles contribute to exciting oxidization of titanium oxide.

Any photocataryst as heretofore disclosed by the prior art has no antibacterial or anti-mold effect unless exposed to ultraviolet rays. However, no source of light such as sunlight or a fluorescent lamp is required of any substrate which is coated or impregnated with the solution of the invention. In this case, the antibacterial anti-mold effects, as well as air and water purification are enhanced with oxidization excited by the solution of the invention.

EMBODIMENT 1

A solution is prepared by mixing and agitatitg altogether 15 wt. % of magnetite particles, 15 wt. % of tounaline particles, 5 wt. % of silica solution and 1.5 wt. % of capsicin particles with 62.65 wt. % of distilled water solution. The solution is then compounded with 0.85 wt. % of a PTX sol as is publicly offered to market.

A steel plate and a flexible plate of H300×W300×D6 mm being each coated with the solution of the invention are provided for a testing purpose, together with same being not coated therewith All the plats were sunk into the sea deep enough to shade ultraviolet rays therefrom, so as to perfonm a regular examination thereof. In this case, in 3 months, see-weeds, barnacles and small shells turned out adhering to the uncoated test plates while said sea-weeds etc. were not discovered at all on the surfaces of the coated plates. In 6 months, favorable results were witnessed, that is, on the surfaces of the uncoated test plates, bamacles etc. turned out growing, while no adhering matters were visible at all on the surfaces of the coated test plates. In this embodiment the dissolving effect of each component into a solution was enhanced with a small amount of methyl alcohol added to said distilled water. Same applied to other embodiments.

EMBODIMENT 2

A solution is prepared by mixng and agitating altogether 10 wt. % of magnetite particles, 10 wt. % of tourmaline particles, 0.2 wt. % of silica solution and 2 wt. % of capsicin particles with 77 wt. % of distilled water solution. Said solution is then mixed with 0.85 wt. % of a TPX sol as publicly offered to market. All surface of a heigt and that up to 40 cm deep of a covered polyvinyl container of H25× W40×D70 cm are coated with said solution and dried at the normal temperature. Some roaches were placed in said container bemg positioned where no ultraviolet rays are irradiated. It was observed that all roaches had gathed in uncoated part of said container.

EMBODIMENT 3

A solution of the invention is prepared by mixing all comtponents of density within the above-mentioned preferable ranges with the base of a TPX sol. Some embodiments were provided by coating some solutions thus prepared on an electric wire on which cheese, too, is uniformly pasted. While another electric wire on which only cheese is pasted without any of the solutions was provided for a compison purpose. It is observed none of the wires coated with the solution were in no case bitten by rats but the comparative electric wires.

EMBODIMENT 4

Generally, a titania film has higher refiaction rate than diamond; hence, in many instances, a substance such as glass whose surface is coated with said film is reflecting in a rainbow color, or its transparence is markedly lost. For example, in case the titania film of the prior art is coated on a glass vessel, it occurs frequently that the inside object such as aquarium fish became hardly visible through glass.

A compound of both TPX sol and a solution prepared by mixing silica solution (0.5 wt. %), tourmaline particles (0.2 wt. %) and capsicin particles (0.01 wt. %) each diled with distilled water is prepared applying a method of the invention In case the surface of same glass vessel was coated with said compound, the glass vessel collected no moisture at all on the surfice.

As established by the embodiments as described above, in case a solution of the invention is coated and dried on the bottom of a large ship, the interior surface of a sewage ditch or an ike of sea water for a power plant etc. where no light reaches, it is possible to prevent barnacles and oysters from adhering thereto.

As set forth earlier, a solution of the invention utilizes as its base TPX sol being offered to market as a solution for providing titania film. Hence, the solution of the invention maintains an excellent adhering effect of said TPX sol. Further, its coating process is simply such as spraying and, its drying carried out at the normal temperature, so that both may affect in no case said adhering effect. Therefore, every compost of the solution of the invention such as capsicin, magnetite and tour ne particles, as well as silica solution is by no means isolated from the base. It follows that the effect of a photocatalyst attributed to the solution of the invention will not deteriorate.

What is claimed is:

1. A method of forming a titania film, comprising:
   forming diluted materials by adding water to a silica solution and particles of capsicin, magnetite and tourmaline;
   combining the diluted materials with a titanium peroxide base; and
   calcining the combined diluted materials and titanium peroxide base at a temperature greater than 80° C.

2. A method of forming a titania film according to claim 1, wherein the titanium peroxide base is formed from a titanium hydrating gel and a peroxide solution.

3. A method of forming a titania film according to claim 1, wherein the diluted materials are formed by adding distilled water.

4. A method of forming a titania film according to claim 1, wherein the diluted materials contain 0.01 to 15 wt. % capsicin particles, based on the total weight of silica solution, capsicin particles, magnetite particles and tourmaline particles.

5. A method of forming a titania film according to claim 1, wherein the diluted materials contain 10 to 40 wt. % magnetite particles, based on the total weight of silica solution, capsicin particles, magnetite particles and tourmaline particles.

6. A method of forming a titania film according to claim 1, wherein the diluted materials contain 0.5 to 15 wt. % tourmaline particles, based on the total weight of silica solution, capsicin particles, magnetite particles and tourmaline particles.

7. A method of forming a titania film according to claim 1, wherein the diluted materials contain 1 to 5 wt. % silica solution, based on the total weight of silica solution, capsicin particles, magnetite particles and tourmaline particles.

* * * * *